United States Patent [19]  [11] 4,065,983
Mimura  [45] Jan. 3, 1978

[54] DEVICE FOR CHANGING THE GEAR RATIO OF A VARIABLE SPEED GEAR MOUNTED TO A BICYCLE

[75] Inventor: Yasuo Mimura, Kawaguchi, Japan

[73] Assignee: Maruishi Cycle Industries, Ltd., Tokyo, Japan

[21] Appl. No.: 669,073

[22] Filed: Mar. 22, 1976

[51] Int. Cl.$^2$ ............... B60K 20/16; B62M 9/04; F16H 1/00
[52] U.S. Cl. ........................ 74/625; 74/335; 280/236
[58] Field of Search .............. 74/625, 626, 335; 280/236

[56] References Cited

U.S. PATENT DOCUMENTS

| | | | |
|---|---|---|---|
| 2,529,660 | 11/1950 | Meyer et al. | 74/625 X |
| 3,548,672 | 12/1970 | Conrad | 74/625 X |
| 3,732,787 | 5/1973 | Yamaguchi | 280/236 X |
| 3,894,442 | 7/1975 | Hembree | 74/335 |

Primary Examiner—Samuel Scott
Assistant Examiner—Lance W. Chandler
Attorney, Agent, or Firm—Ladas, Parry, Von Gehr, Goldsmith & Deschamps

[57] ABSTRACT

Discloses an electromechanical device for changing the gear ratio of a variable speed gear mounted to the hub of the rear wheel of a bicycle. The device consists of a changeover switch section to be mounted to the steering handle of the bicycle and an essential section to be coupled with the variable speed gear so as to operate the gear, said essential section includes a motor, gear means to be operated by said motor, and an electric circuit for connecting said motor to a power source. The electric circuit controls the motor according to the operation of the change-over switch and also controls the operation of the variable speed gear so that the gear ratio may be changed.

3 Claims, 10 Drawing Figures

DEVICE FOR CHANGING THE GEAR RATIO OF A VARIABLE SPEED GEAR MOUNTED TO A BICYCLE

This invention relates to a gear selection mechanism for operating a variable speed gear of a cycle, particularly of a bicycle.

Generally in such a device of the prior art, in order to operate a variable speed gear mounted to the wheel hub of a bicycle to select the gear ratio of the variable speed gear, an operating lever of switching means mounted to the frame or the steering handle of the bicycle, has been manipulated whereby to change the gear ratio of the variable speed gear.

In such a device of the prior art, since the operating lever is manipulated while cycling, one hand should be made free of the steering handle, therefore, such a behavior has not only been inconvenient to control the bicycle but frequently attended with danger during the cycling.

Recently, gear selection mechanisms for operating a variable speed gear of a bicycle by manipulating a control switch mounted to the bicycle handle, are existing, however, they are not capable of selecting the gear ratio automatically.

One of the objects of the present invention is to provide a gear selecting mechanism which is capable of selecting the gear ratio of a variable speed gear automatically by operating a control switch mounted to the steering handle of a bicycle.

Another object of the present invention is to provide an electromechanical gear selecting mechanism for operating a variable speed gear by manipulating a control switch.

Another object of the present invention is to provide a gear selecting mechanism having means for immediately stopping the operation of the gear selecting mechanism when means for operating a variable speed gear is overloaded.

A further object of the present invention is to provide a gear selecting mechanism provided with a safety device which is capable of selecting any desired gear ratio of a variable speed gear when some trouble has arisen in the electric system.

These and other objects and advantages of the present invention will become clear from the following description with reference to the accompanying drawings, wherein:

Figure 1:
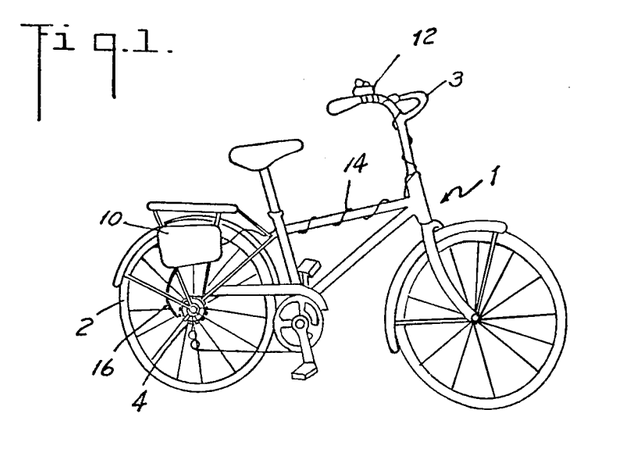
FIG. 1 is a schematic view of a bicycle equipped with the device of the present invention.

As shown in FIG. 1, the novel gear ratio changing device of a variable speed gear of a bicycle consists of an essential section 10 mounted to the frame at a rear wheel 2 of the bicycle 1 and a switch section 12 mounted to a part of the bicycle where the switch is most easily manipulated by a cyclist such as a steering handle 3, and the switch section 12 is connected to electric conductors of the essential section 10 through a flexible cord 14. A variable speed gear 4 provided as a part of the rear wheel 2 is connected to the essential section 10 through a wire 16 for transmitting the operation of the essential section 10 to the variable speed gear so that the gear ratio thereof is changed.

Firstly, a typical embodiment of the essential section 10 of the gear ratio changing device of the present invention will be described. For convenience' sake, the variable speed gear 4 mounted to the bicycle will be described as a five-speed gear. It is understood, however, that the gear ratio changing device of the present invention can also be applied to any other variable speed gears of more or less than five speeds.

Figure 2:
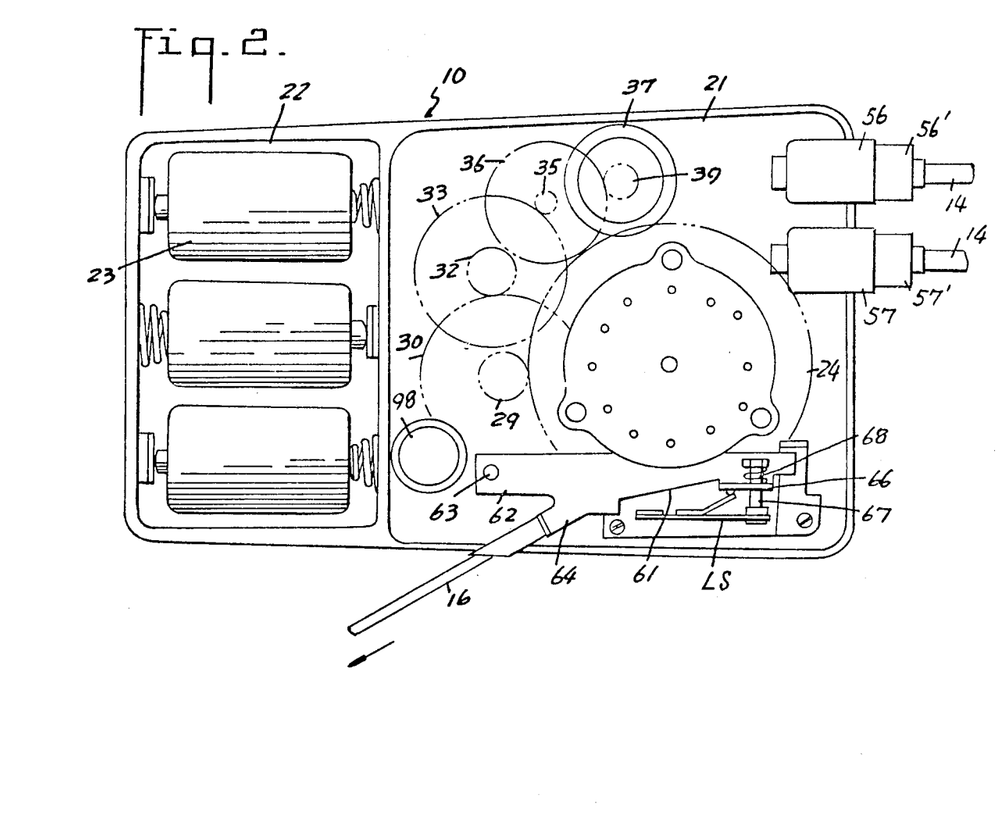
FIG. 2 is a plan view of the essential section of the device of the present invention with the cover thereof being removed.

FIG. 2 is a plan view of the essential section 10 of the gear ratio changing device of the present invention with the cover thereof being taken off. As shown in FIG. 2, the essential section 10 is divided into a compartment 21 for movable parts and a power source compartment 22 which contains dry cells 23 as a suitable power source.

In the movable part compartment 21 of the essential section 10, a first spur gear 27 is rotatably mounted to a main shaft 26 having the ends respectively journaled in a base plate 24 of a casing and a bearing plate 25. As clearly shown in FIG. 3, the first spur gear 27 meshes with a pinion 29 mounted to a shaft 28 having the ends respectively journaled in the base plate 24 and the bearing plate 25, a second spur gear 30 which is rotated with the pinion 29 of the shaft 28 meshes with a pinion 32 of a shaft 31 having the ends respectively journaled in the base plate 24 and the bearing plate 25, a spur gear 33 which is rotated with the shaft 31 meshes with a pinion 35 of a shaft 34 having the ends respectively journaled in the base plate 24 and the bearing plate 25, and a spur gear 36 which is rotated with the shaft 34 meshes with a pinion 39 mounted to an output shaft 38 of an electromagnetic motor 37 secured to the bearing plate 25. Thus when the motor 37 is energized to rotate the output shaft 38, the first spur gear 27 of the main shaft 26 is rotated through the gear train.

Figure 3:
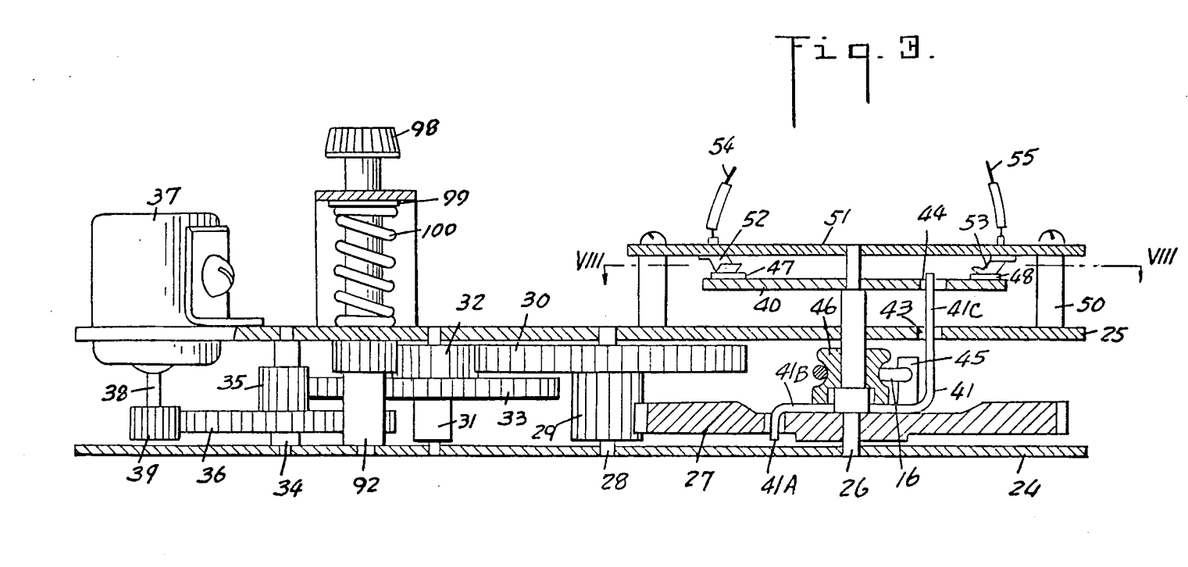
FIG. 3 is a side view showing the internal construction of the essential section of the device of the present invention.

The main shaft 26 is extended through the bearing plate 25 and a switch disc 40 is fitted on the extended portion of the main shaft 26. The switch disc 40 is coupled to the first spur gear 27 by a coupling memeber 41. As shown in FIG. 3, the coupling member 41 comprises three bent portions 41A, 41B and 41C, the first bent portion 41A is engaged with a hole 42 formed through the first spur gear 27, the second bent portion 41B is fitted in the main shaft 26 and the third bent portion 41C is extended through an arcuate opening 43 formed in the bearing plate 25 and engaged with a hole 44 formed in the switch disc 40. A suitable portion, for example, the second bent portion 41B of the coupling member 41 is provided with a mounting member 45 for securing one end of the wire 16 which is operated to change the gear ratio of the variable speed gear 4 of the bicycle, and the wire 16 is extended through a winding pully 46 mounted to the main shaft 26 and a safety device to be described hereinafter to the outside of the essential section 10 of the gear ratio changing device so that the gear ratio of the variable speed gear 4 may be changed according to the movement of the wire 16.

Figure 4:
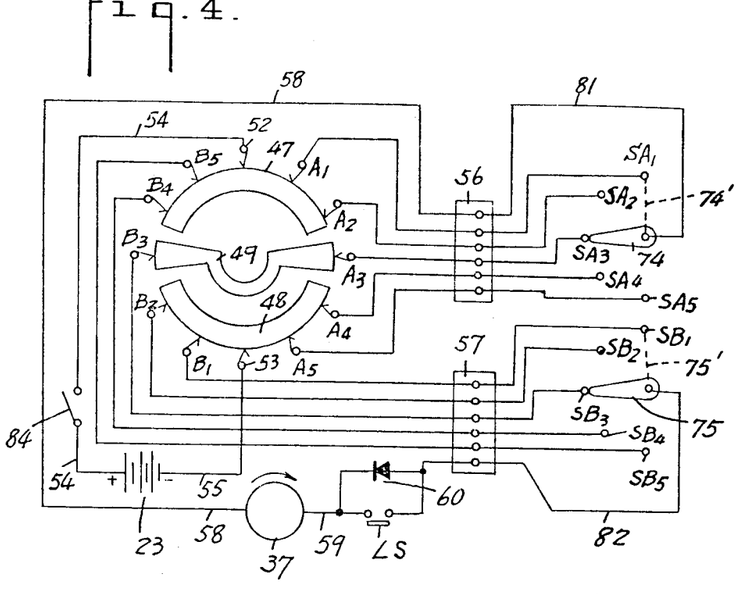
FIG. 4 is a circuit diagram for explaining the operation of the device of the present invention.

As shown in FIG. 4, one face of the switch disc 40 is provided with two arcuate band conductors 47, 48 and an intermediate conductor 49 interposed between the band conductors 47 and 48. A plate 51 is placed above the switch disc 40 having the conductors 47, 48 and 49 on its face and secured to the bearing plate 25 through spacers 50 so that the plate 51 is suitably spaced from the bearing plate 25. Contact pieces 52, 53 are disposed on the plate 51. The contact piece 52 is brought into contact with either of the conductors 47, 48 on the disc and is connected to the positive side of the power source 23 through a lead wire 54. Similarly, the contact piece 53 is brought into contact with either of the conductors 47, 48 on the disc and is connected to the negative side of the power source 23 through a lead wire 55. The plate 51 is further provided with a group of five contact pieces $A_1$, $A_2$, $A_3$, $A_4$ and $A_5$ and another group of five contact pieces $B_1$, $B_2$, $B_3$, $B_4$ and $B_5$. The contact pieces $A_{1-5}$ are connected to a connector 56 in the essential section 10 of the gear ratio changing device through their lead wires, while the contact pieces $B_{1-5}$ are connected to another connector 57 in the essential section 10 of the gear ratio changing device through their lead wires.

The motor 37 is connected to one terminal of the connector 56 through a lead wire 58 and is also connected to one terminal of the connector 57 through a lead wire 59. As shown in the circuit diagram of FIG. 4, a limit switch LS and a diode 60 are connected in parallel to the lead wire 59.

The limit switch LS is actuated by a safety device 61. As shown in FIG. 2, the safety device 61 is formed of a Y-shaped member, one arm 62 of which is pivotally mounted to the bearing plate 25 by a pin 63 while a wire 16 is passed through another arm 64 extending diagonally. The third arm 65 of the safety device 61 is provided with a normally-bent projection 66 at the side edge of the free end. This projection 66 normally closes the contact of the limit switch LS through bias means consisting of a pin 67 and a spring 68. The spring 68 has a strength sufficient to normally resist to the tension of the wire 16 in the direction shown by an arrow (FIG.2), however, when the tensile load of the wire 16 has exceeded a predetermined value and overcome the strength of the spring 68, the safety device 61 is pivoted about the pin 63 to open the contact of the limit switch LS by the projection 66.

Figure 5:
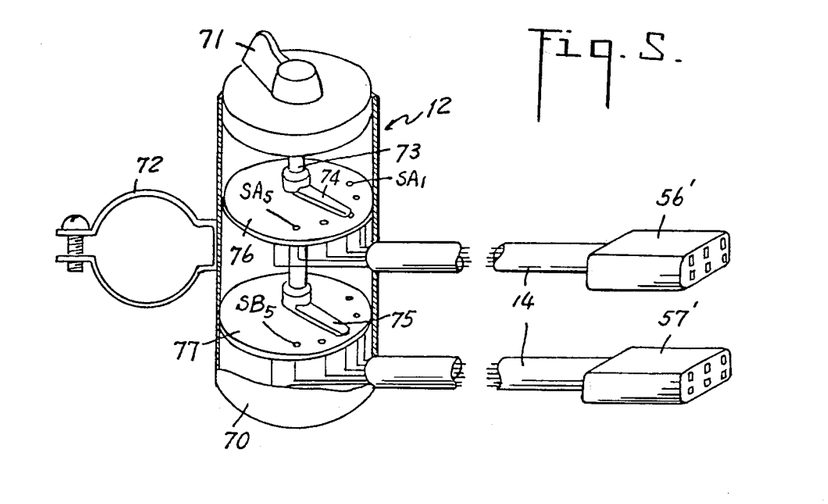
FIG. 5 is a schematic perspective view of the switch section of the device of the present invention.

Now the switch section 12 to be attached to the handle 3 of the bicycle 1 will be described. As shown in FIG. 5, the switch section 12 of the gear ratio changing device of the present invention comprises a casing 70, a switch handle 71, and a clamp 72 for mounting the switch section 12 to the bicycle 1.

The switch handle 71 is attached to a shaft 73 rotatably mounted in the casing 70 and the shaft 73 is provided with two sliding arms 74, 75 spaced from each other and mounted so as to be rotatable with the shaft 73. A disc 76 is arranged in a position to cooperate with the first sliding arm 74 and another disc 77 is arranged in a position to cooperate with second sliding arm 75. The first disc 76 has five contacts $SA_{1-5}$ while the second disc 77 has five contacts $SB_{1-5}$. The first sliding arm 74 is terminated in a terminal of a connector 56' to be connected to the connector 56 of the essential section 10 through a lead wire 81. In the same manner, the second sliding arm 75 is terminated in a terminal of a connector 57' to be connected to the connector 57 of the essential section 10 through a lead wire 82.

The contacts $SA_{1-5}$ of the first disc 76 are respectively terminated in corresponding terminals of the connector 56' through lead wires and the contacts $SB_{1-5}$ of the second disc 77 are respectively terminated in corresponding terminals of the connector 57' through lead wires.

When the connector 56 of the essential section 10 is coupled with the connector 56' of the switch section 12 and the connector 57 of the essential section with the connector 57' of the switch section, the lead wire 81 of the first sliding arm 74 is connected to the lead wire 58 of the motor 37 and the lead wire 82 of the second sliding arm 75 is connected to the lead wire 58 of the motor 37 whereby an electric circuit as shown in FIG. 4 is completed. In the circuit, the lead wire 54 for connecting the power source 23 to the contact piece 52 is provided with a switch 84.

In the next place, the operation of the device of the present invention will be described. As shown in FIG. 4, after coupling the connectors 56, 57 of the essential section 10 respectively with the connectors 56', 57' of the switch section 12, and when the switch 84 is made on, the circuit of the device of the present invention will be completed. Now assume that the first sliding arm 74 of the switch section 12 is in a position in which it is in contact with the contact $SA_3$ and the second sliding arm 75 is in a position in which it is in contact with the contact $SB_3$, as shown in FIG. 4. In this case, the lead wire 54 on the positive side of the power source 23 communicates with the lead wire 47 of the disc through the contact piece 52, however, no current is passed through other contact pieces $A_{1-2}$ and $B_{4-5}$ to energize the motor 37. Thus the gears of the essential section 10 are not rotated and the wire 16 is not moved. Therefore, the variable speed gear 4 of the bicycle maintains a gear ratio which has been previously set.

When the switch handle 71 of the switch section 12 is manipulated to move the first sliding arm 74 from the position shown in FIG. 4 to a position in which it is brought into contact with the contact $SA_1$ as shown by a dotted line 74', the second sliding arm 75 is simultaneously turned to a position in which it is brought into contact with the contact $SB_1$ as shown by a dotted line 75'. In this state, the current flows from the positive side to the negative side of the power source 23 through lead wire 54, contact piece 52, conductor 47, contact piece $A_1$, contact $SA_1$, the first sliding arm 74', lead wire 81, lead wire 58, motor 37, lead wire 59, limit switch LS, lead wire 82, the second sliding arm 75', contact $SB_1$, contact piece $B_1$, conductor 48, contact piece 53 and lead wire 55, so that the motor 37 is rotated in the direction shown by an arrow.

The rotation of the motor 37 is transmitted to the first gear 27 of the main shaft 26 through the gear train to turn the switch disc 40 through the coupling member 41. The disc 40 is turned from the position shown in FIG. 4 to the position shown in FIG. 6 in which it is stopped. In other words, when contacts $A_1$ and $B_1$ are brought into contact with the conductor 47 as the disc 40 is turned, the circuit communicating with the power source 23 is interrupted so that no current is passed to the motor 37, and at the same time, as clear from FIG. 6, the motor 37 is short-circuited through lead wire 58, lead wire 81, the first sliding arm 74, contact piece SA, contact $A_1$, conductor 47, contact piece $B_1$, contact $SB_1$, the second sliding arm 75, lead wire 82 and lead wire 59 to suddenly stop the motor 37. During this operation, the wire 16 is secured to the mounting member 45 of the coupling member 41 is wound and drawn by the winding pulley 46 to move the wire until the rotation of the switch disc 40 stops, thus the gear ratio of the variable speed gear 4 of the bicycle is changed.

Figure 6:
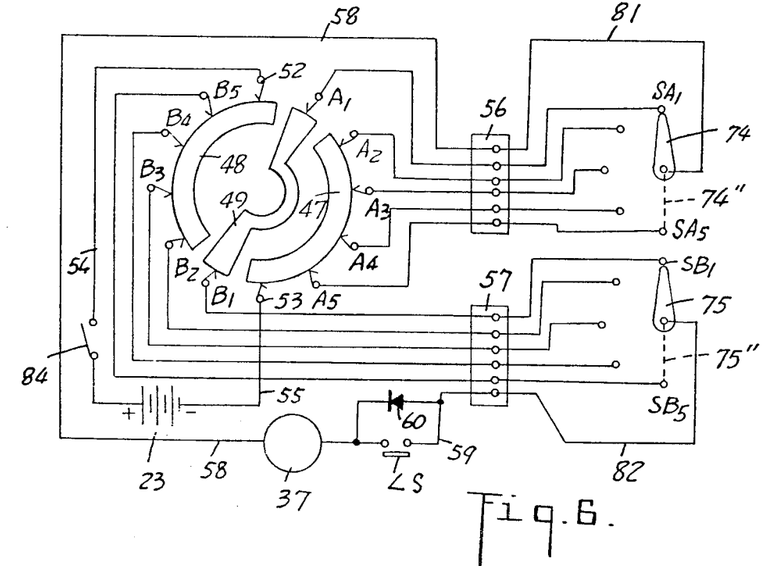
FIGS. 6 and 7 are circuit diagrams for explaining the operation of the device of the present invention.

Then when the first sliding arm 74 is moved by operating the handle 71 of the switch section 12 to the position in which it comes into contact with the contact $SA_5$, the second sliding arm 75 simultaneously comes into contact with the contact $SB_5$. In FIG. 6, the positions of the sliding arms 74, 75 are shown by dotted lines 74", 75" respectively. As evident from FIG. 6, such a positioning of the sliding arms 74, 75 completes a circuit starting from the positive side of the power source 23 to the negative side thereof through lead wire 54, contact piece 52, conductor 48 on the disc, contact piece $B_5$, contact $SB_5$, the second sliding arm 75", lead wire 82, lead wire 59, limit switch LS and diode 60, motor 37, lead wire 58, lead wire 81, the first sliding arm 74", contact $SA_5$, contact piece $A_5$, conductor 47, contact piece 53 and lead wire 55. Thus the motor 37 is rotated in the direction opposite to the direction shown by the arrow in FIG. 4. In such a state, even if the limit switch LS is opened for some reason, the motor 37 is still energized because the current passes through the diode 58.

Figure 7:
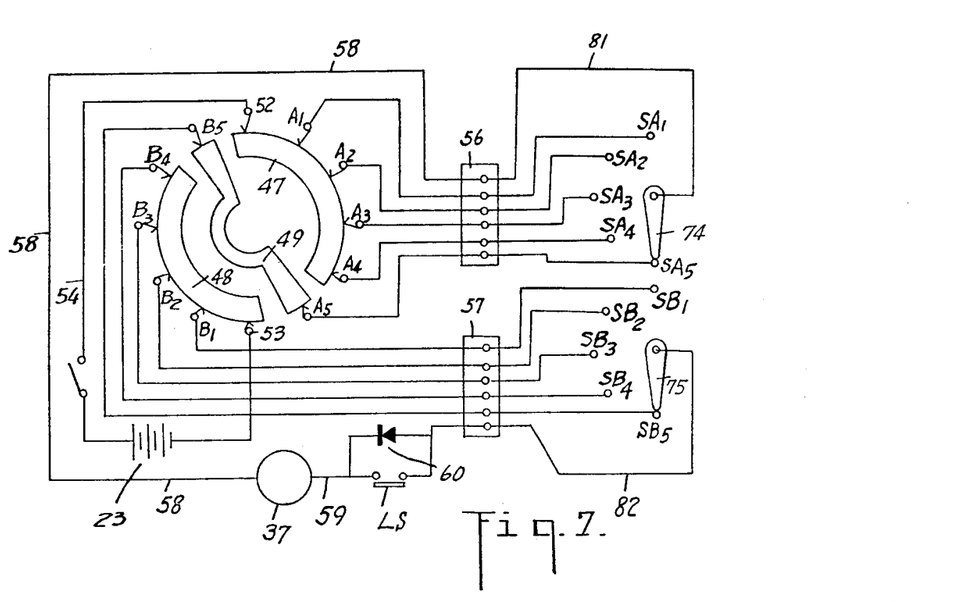

The rotation of the motor 23 causes the first gear 27 of the main shaft to be rotated through the gear train in the direction opposite to the direction described hereinbefore and the switch disc 40 to be rotated through the coupling member 41. The disc 40 is rotated from its position shown in FIG. 6 to the position shown in FIG. 7 in which it is stopped. During this operation, the wire 16 secured to the mounting member 45 of the coupling member 41 is sent out of the pulley 46 so as to move the wire until the rotation of the switch disc 40 stops, thus the gear ratio of the variable speed gear 4 of the bicycle is changed according to the movement of the wire.

In such a case, even if the limit switch LS is opened for some reason, the motor 37 is still energized because the current passes through the diode 58.

In operation, as soon as the rotating motor 37 is stopped, the current being fed from the power source 23 to the motor is suddenly interrupted and then the poles of the motor 37 are communicated with each other through the conductor 49 of the switch disc. Therefore, at first the motor 37 tends to keep up rotating, however, since the magneto type motor 37 acts as a generator, the current generated thereby is consumed by the resistance of the conductor 49, therefore, the motor 37 is electromagnetically braked, thus it may be stopped suddenly.

Figure 8:
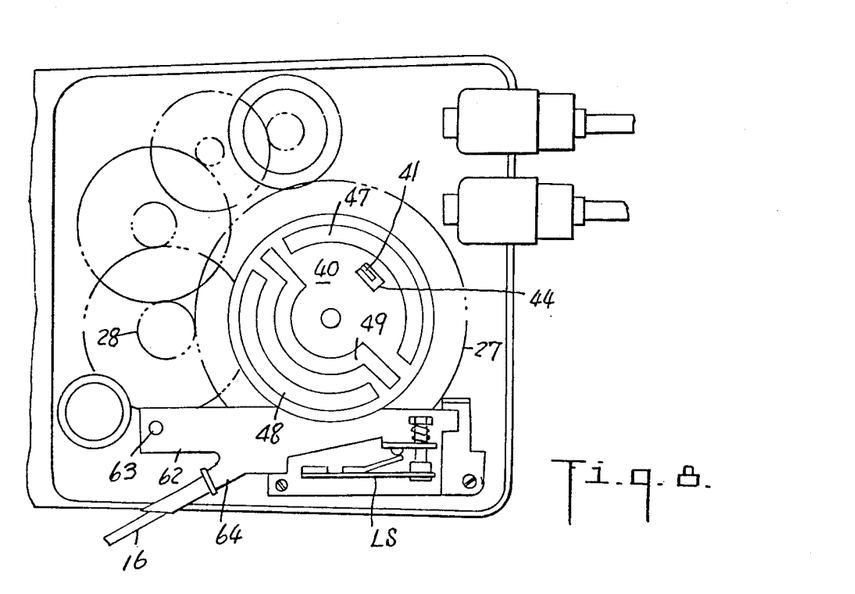
FIG. 8 is a plan view taken along line VIII—VIII of FIG. 3, and FIGS. 9 and 10 are partial sectional views of the manual gear ratio selecting device in the device of the present invention.

As shown in FIG. 8, the end of the coupling member 41 is inserted into the hole 44 formed in the switch disc 40 with a certain play so as to provide a play between the winding pulley 46 and the switch disc 40. Primarily the rotation of the winding pulley 46 must faithfully follow the rotation angle of the switch disc 40 determined by the relationship between the switch disc 40 and the contact pieces 52, 53, $A_{1-5}$ and $B_{1-5}$, however, from the viewpoint of the characteristics of the variable speed gear mounted to the bicycle, a play of an angle of, for example, about 4 degrees, is provided between the winding pulley 46 and the switch disc 40 so that the disc 40 continuously follows the rotation of the winding pulley 46 in some delay, hereby the winding pulley 46 may be moved to its stop position slightly ahead of that of the switch disc 40.

As set forth hereinabove, in the device of the present invention, when the switch handle 71 is manipulated to move the first and second sliding arms 74, 75 from their set positions toward a lower level side, for example, toward the contact $SA_1$, the wire 16 is tensioned by the winding pulley 46 due to the rotation of the motor 37 so as to change the gear ratio of the variable speed gear 4 to a lower ratio. When the switch handle 71 is turned from a set position toward a higher level side, for example, toward the contact $SA_5$, the wire 16 is loosened and stopped at a point at where the set positions of the sliding arms 74, 75 correspond with the relative position of the disc 40, thus the gear ratio of the variable speed gear 4 may be changed to a higher ratio.

In general, in order to change the gear ratio of a variable speed gear mounted to a bicycle, the variable speed gear should be operated while pedalling the bicycle. If the switch handle 71 of the switch section 12 is manipulated and the wire 16 is moved in the direction in which it is loosened, there will be no trouble at all, however, when the wire 16 is moved in the direction in which the wire is tensioned, since the variable speed gear 4 does not follow the winding operation of the wire 16, there is a fear of arising troubles such as cutting the wire 16, damaging the variable speed gear or overheating the motor 37. In the device of the present invention, however, since the wire 16 cooperates with the safety device 61 as described hereinbefore, when the wire 16 is tensioned and the tensile load exceeds a predetermined value, the contact of the limit switch LS is opened to interrupt the current flowing to the motor 37 whereby such troubles may be prevented.

Since the device of the present invention for changing the gear ratio of a variable speed mounted to a bicycle uses dry cells 23 as a power source, a manual gear ratio selecting device 90 is provided to manually select any desired position of the gear ratio changing device 10 when the capacity of the cells is decreased or a trouble is arisen in the electric system.

Figure 9:
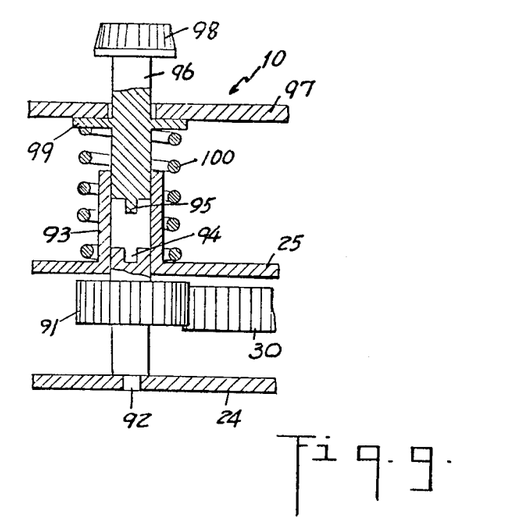
Figure 10:
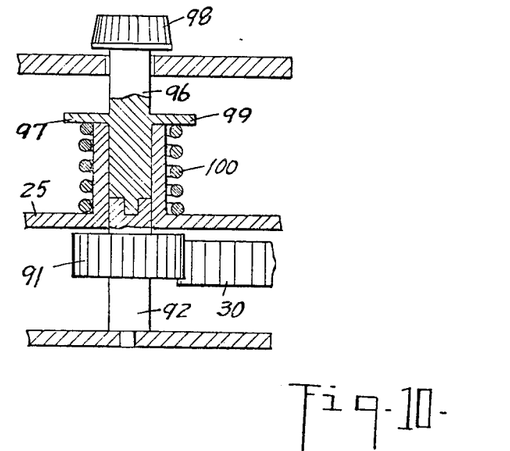

As shown in FIG. 9, the manual gear ratio selecting device 90 includes a shaft 92 provided with a gear 91 which is arranged to mesh with the second gear 30 of the essential section 10 of the device of the present invention. The shaft 92 is journaled in the base plate 24 and a sleeve 93 integrally attached to the bearing plate 25. The end of the shaft 92 which is journaled in the bearing plate 25 is formed with a kerf or slot 94. A shaft 96 having at one end a projection 95 which is formed to be matchable with the slot 94, is extended downwardly into the sleeve 93 through the casing of the essential section 10 or an opening 98 in a supporting plate 97. The other end or the upper end of the shaft 96 is provided with a knob 98, the shaft 96 is provided with a flange 99 at an intermediate portion thereof and a coil spring 100 is situated between the flange 99 and the bearing plate 25. As shown in FIG. 9, the shaft 92 and the shaft 96 are normally spaced from each other by the action of the coil spring 100. However, when the knob 98 is pushed down against the force of the coil spring 100 and turned, the shafts 92, 96 are coupled together by the combination of their slot 94 and projection 95 whereby the first gear 27 may be rotated through the gear 91 and the second gear 30. In this manner, the wire 16 may be moved in a desired direction according to the turning direction of the knob 98 and whereby the gear ratio of the variable speed gear may be selected for a desired rate.

What is claimed is:

1. An electromechanical device for changing the gear ratio of a variable speed gear mounted to the hub of the rear wheel of a pedal cycle, comprising an essential section to be mounted to the frame adjacent the rear wheel of the cycle, a manual switch to be mounted to the steering handle, and a flexible wire for connecting the essential section and the variable speed gear, said essential section comprising an electric power source, a reversible motor, a main shaft of a spur gear to be rotated through gear mechanisms by said motor, a switch disc mounted on said main shaft, means for connecting said spur gear and said switch disc, means for securing one end of said flexible wire to said connecting means, two arcuate conductors provided on the face of said switch disc, an intermediate conductor interposed between said arcuate conductors, a conductor for connecting the positive side of said power source through a first contact to one of said arcuate conductors, a second conductor for connecting the negative side of said power source through a second contact to other of said arcuate conductors, and a plurality of conductors for connecting said arcuate and intermediate conductors to said manual switch.

2. A device for changing the gear ratio of a variable speed gear as claimed in claim 1, wherein said device further comprises means engageable with said gear means in said essential section to manually select the gear ratio of said variable speed gear when said electric cricuit means is interrupted.

3. A pedal cycle having a frame, a rear wheel mounted to the frame and having a hub, a variable speed gear mounted to the hub, a steering handle, a pedal crank, means connecting the pedal crank to the variable speed gear, and an electromechanical device for changing the gear ratio of the variable speed gear and comprising:

an essential section mounted to the frame adjacent the rear wheel of the cycle;
a manual switch mounted to the steering handle; and
a flexible wire connecting the essential section and the variable speed gear,
said essential section comprising an electric power source, a reversible motor, a main shaft of a spur gear to be rotated through gear mechanisms by said motor, a switch disc mounted on said main shaft, means for connecting said spur gear and said switch disc, means securing one end of said flexible wire to said connecting means, two arcuate conductors provided on the face of said switch disc, an intermediate conductor interposed between said arcuate conductors, a conductor for connecting the positive side of said power source through a first contact to one of said arcuate conductors, a second conductor for connecting the negative side of said power source through a second contact to other of said arcuate conductors, and a plurality of conductors for connecting said arcuate and intermediate conductors to said manual switch.

* * * * *